(No Model.)
E. S. & C. R. BROWN.
CULTIVATOR.
No. 338,709.  Patented Mar. 30, 1886.
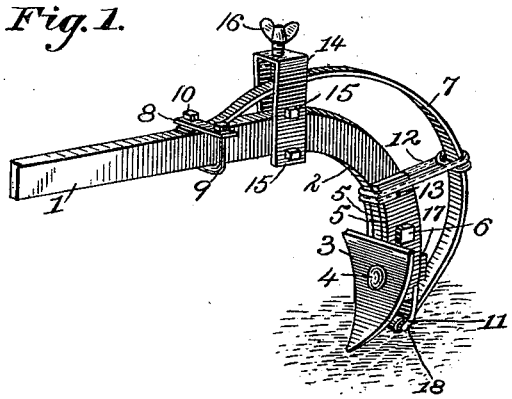
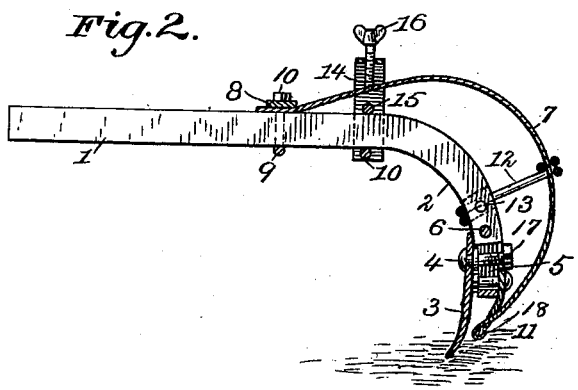
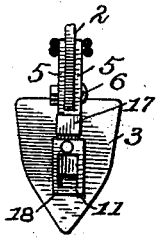
Witnesses
Wm. J. Tanner
Marvin A. Custis
Inventors
Elisha S. Brown
Charles R. Brown
by Ewell & Dex
their Attorney

UNITED STATES PATENT OFFICE.

ELISHA S. BROWN AND CHARLES R. BROWN, OF SANTA ROSA, MISSOURI.

CULTIVATOR.

SPECIFICATION forming part of Letters Patent No. 338,709, dated March 30, 1886.

Application filed December 16, 1885. Serial No. 185,784. (No model.)

*To all whom it may concern:*

Be it known that we, ELISHA S. BROWN and CHARLES R. BROWN, of Santa Rosa, in the county of De Kalb and State of Missouri, have invented certain new and useful Improvements in Cultivators, of which the following is a specification.

Our invention relates especially to that class of cultivators in which the shank or beam of the share or shovel is composed of two parts pivotally united, the one part being for attachment to the frame of the cultivator, while the other part carries the share or shovel, a spring of sufficient resiliency being used to hold the two parts in such relation that the share or shovel is normally in operative position, but is enabled to yield to, rise, and pass over obstructions dangerous to a rigidly-mounted share or shovel.

The object of our invention is to furnish a simple, cheap, and reliable construction for a cultivator of such class; and it consists in the features more particularly hereinafter described and claimed.

In carrying our invention into effect the share or shovel is made in two parts pivoted together, the upper and longer part being for the securement of the share or shovel in or to the proper cultivator-frame, while the share is attached to the lower and shorter part, which, as stated, is pivoted to the other immediately above or near to the share or shovel. At the rear of the share or shovel a circular bar or leaf spring is arranged, whose upper end is secured to or upon the upper part of the beam or shank, thence passing around the rear of the shovel, and having its lower end attached to lower part of the shank or shovel, or to an extension thereof near the end of the shovel. This spring is of such force and resilience as to normally throw forward and hold the shovel in proper operative position. Upon the upper part of the beam or shank is mounted a yoke passing over the spring and affording a seat for an adjusting-screw, which, passing through the top of the yoke, takes directly upon the spring, whereby its tension may be regulated and adjusted. The upper end of the lower part of the shank or beam carrying the shovel or share is connected with the center of the spring by an arm or connection from one to the other, this causing the spring to act on the share or shovel at two points, one above and the other below the pivotal point. The construction thus generally sketched may be better understood by reference to the drawings, in which—

Figure 1 is a perspective view, and Fig. 2 a longitudinal vertical section embodying our invention, while Fig. 3 is a rear plan view of a detached shovel or share.

In the drawings, the reference-numeral 1 indicates the upper part of the shank or beam by which the shovel or share is to be secured to suitable frame-work, (not herein shown, as no part of this invention relates thereto.) 2 is the rearward and lower portion of this shank or beam, to which is attached the share or shovel 3 by a bolt, 4, and nut 17. This portion 2 is preferably made as a yoke or elongated U, which may conveniently be done by bending a bar into the shape so that it has two parallel arms or sides, 5 5, the bolt 4 passing through the share or shovel 3, and thence between the sides 5 5, the hub 17, applied thereto, being of sufficient size to bridge the distance between 5 5 and rest on each of them for securely holding the shovel in the desired position, while the slot formed between the two sides 5 5 permits vertical adjustment of the share or shovel. The upper open portion of the yoke or U passes around the rear end of the part 1, the sides 5 5 lying on either side thereof. A nutted bolt, 6, passes through both sides 5 5 and the intermediate portion of 1, thus pivoting them together.

To normally throw forward and hold the share or shovel in operative position the spring 7 is used. This spring is a flat bar-spring, which may be a single strip or compound and composed of several leaves, and is so formed that its ends tend naturally to spring inwardly, tending to form a circle or a spiral. One end of this spring 7 is secured to or upon the part 1 of the beam or shank, which may be accomplished by placing the end upon 1 and under a plate, 8, a yoke, 9, passing from end of the plate down around 1 and up to the other end of the plate. The ends of this yoke pass through apertures in the plate, and are preferably screw-threaded to receive nuts 10, which clamp the plate 8 upon 1 and secure that end of the spring. Formed with the lower end, 11, of the part 2, or by a piece attached thereto, is a projection, 11, extending to nearly the end of the share or shovel. In this projection an aperture is made, whose lower boundary forms a bar, 18, to which the other end of the spring is attached by bending or in other suitable manner. As seen, this spring touches the parts of the beam or shank at its ends only, springing away therefrom during the remainder of its length, affording opportunity for use of a set-screw taking directly thereon, as hereinafter noted. The stress of this spring tends normally to throw the share or shovel forward. To limit the amount of this forward disposition thereof, and to cause the spring to act upon the share or shovel at two points, an arm or brace, 12, is used, connecting the spring with the part 2 above its pivotal point. A convenient and reliable construction preventing displacement of the brace or arm is to form it of a rod or wire of sufficient strength passed at its center entirely around spring 7 at least once, so as to form a loop therearound, whence the ends pass on either side of 2, are each bent around to the opposite sides thereof, the free ends being secured, forcing them into holes or depressions 13 13 in the sides 5 5 of the part 2. Displacement could also be prevented by making the brace or arm as a simple arm, resting or taking in a suitable notch formed in the sides 5 5. It will be seen that the part of the brace or arm passing around 5 5 forms a stop, which, taking against the intermediate portion of the part 1, limits the forward throw and position relatively thereto of the part 2 and attached shovel or share 3.

In order to adjust the tension of the spring upon the share or shovel to the proper degree, a yoke, 14, is secured to and rising above 1 by rivets or bolts 15 15, through the upper and open portion of which the spring 7 passes. Seated in the top of such yoke is an adjusting-screw, 16, whose inner end is adapted to take upon the spring 7. Thus by the elevation or depression of this screw the tension of the spring may be adjusted, as desired, to cause it to exert just the degree of force needed. This construction then provides for the flexible or resilient attachment of the share or shovel in such manner that it is held in proper position for operation under ordinary conditions, but permits it to yield and assume position for readily passing over obstructions otherwise dangerous to its organization, while at the same time the strain and force due to meeting with such obstructions is transferred to the spring at two points, the resilience of the spring counteracting such strain and force without injury to the non-flexible or non-resilient parts.

We are aware that it is not broadly new to construct the share or shank of a cultivator tooth, shovel, or share in two parts pivoted together and combined with a spring to hold the tooth, shovel, or share normally in operative position and permit it to yield to dangerous obstructions, or to use therewith an adjusting-screw to vary or regulate the force required to move the tooth, share, or shovel from its normally-operative position; hence we do not claim such; but What we do claim, and desire to secure by Letters Patent, is—

1. The combination, with a shovel or share, of a beam or shank composed of two parts pivotally united, a bar or leaf spring passing around the rear of and attached at its ends to both parts, but springing away therefrom during the remainder of its length, a yoke secured upon the upper part of the shank or beam, and a set-screw seated therein and taking directly upon the spring, substantially as and for the purposes hereinbefore set forth.

2. The combination, with a share or shovel, of a beam or shank composed of two pivotally-united parts, the upper adapted to be secured to the frame-work of a cultivator, the lower carrying the shovel or share, and a leaf or bar spring upon the rear of both parts and attached at one end to one point of the upper part of the beam or shank, and at the other end to the lower part at two points, one above and one below the pivotal point thereof, substantially as and for the purpose set forth.

3. The combination, with a shovel or share, of a beam or shank composed of two pivotally-united parts, a bar or leaf spring connected at one end to the upper part, and at its other end to the extreme limit of the lower part below its pivotal point, and a brace or arm extending from the spring and uniting it to the lower part above the pivotal point thereof, substantially as and for the purposes hereinbefore set forth.

4. The combination, with a shovel or share, of a beam or shank composed of two pivotally-united parts, a leaf or bar spring passing around the rear of and attached at its ends to both parts, and an intermediate brace or arm made as a loop or link passing around the spring and around the lower part of the shank or beam above its pivotal point, whereby the spring is connected to a second point of the lower part of the beam or shank and the forward movement of the share or shovel is limited, substantially as and for the purposes hereinbefore described.

5. The combination, with a shovel or share, of a shank or beam made in two parts pivoted together, a leaf or bar spring acting at its ends upon both parts, a yoke and plate mounted upon the beam portion for securing the spring thereto, and a bar attached to the lower end of the pivoted portion for the securement of the other end of the spring, substantially as set forth.

6. The combination, with a shovel or share, of a shank or beam made in two parts pivoted together, a leaf or bar spring connected at its ends to and acting upon both parts, an adjusting-screw for regulating the tension of the spring, and an intermediate loop, brace, or arm connecting the spring and lower part of
5 the shank or beam at a second point, substantially as set forth.

In testimony whereof we have hereunto set our hands this 12th day of December, 1885.

ELISHA S. BROWN.
CHARLES R. BROWN.

Witnesses:
WM. NEIL,
ZEPHANIAH STOUT.